(12) United States Patent
Miller et al.

(10) Patent No.: US 6,702,524 B2
(45) Date of Patent: Mar. 9, 2004

(54) BROACH CARRIER

(75) Inventors: Raymond T. Miller, Indianapolis, IN (US); Richard Sharp, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/965,104

(22) Filed: Sep. 26, 2001

(65) Prior Publication Data

US 2002/0182017 A1 Dec. 5, 2002

Related U.S. Application Data

(63) Continuation of application No. PCT/US01/17938, filed on Jun. 4, 2001.

(51) Int. Cl.[7] .......................... B23P 15/42; B23D 37/00
(52) U.S. Cl. ............................................ 407/13; 407/18
(58) Field of Search ........................... 407/13, 12, 15, 407/16, 19, 18, 29.11, 29.14, 29.15, 29.1, 37, 38, 39, 46, 47

(56) References Cited

U.S. PATENT DOCUMENTS

| | | | |
|---|---|---|---|
| 113,800 A | * 4/1871 | Russell | 407/29.14 |
| 309,973 A | * 12/1884 | Muller | 407/29.4 |
| 545,739 A | 9/1895 | Shaw | |
| 570,511 A | * 11/1896 | Shaw | 407/29.14 |
| 593,028 A | 11/1897 | Olson | |
| 1,440,933 A | * 1/1923 | Perkins et al. | 407/17 |
| 1,677,815 A | * 7/1928 | Croft | 407/18 |
| 1,744,217 A | 1/1930 | Forberg | |
| 2,076,999 A | * 4/1937 | Miller | 407/39 |
| 2,538,844 A | 1/1951 | Nimz | |
| 3,528,154 A | 9/1970 | Schmidt | |
| 3,548,474 A | 12/1970 | Meyer | |
| 3,641,642 A | * 2/1972 | Schmidt | 407/17 |
| 3,662,443 A | * 5/1972 | Schmidt | 407/17 |
| 3,707,748 A | 1/1973 | Price et al. | |
| 3,849,852 A | 11/1974 | Billups | |
| 4,038,730 A | 8/1977 | Tersch | |
| 4,243,347 A | 1/1981 | Clapp et al. | |
| 4,274,766 A | 6/1981 | Raupp, Jr. et al. | |
| 4,564,320 A | 1/1986 | Roseliep | |
| 4,801,226 A | 1/1989 | Gleason | |
| 4,993,889 A | 2/1991 | Kelm | |
| 5,242,251 A | 9/1993 | Armstrong et al. | |
| 5,352,068 A | 10/1994 | Roseliep | |

* cited by examiner

*Primary Examiner*—Henry W. H. Tsai
(74) *Attorney, Agent, or Firm*—Woodard, Emhardt, Moriarty, McNett & Henry LLP

(57) ABSTRACT

A broach tool including a row of longitudinally aligned cutting inserts (22) spaced apart by removable insert support members (25). The insert support members (25) and the cutting inserts (22) each have a root portion captured within the main body of the broach tool. Bracing support is provided to each of the cutting inserts (22) during a broaching operation by one of the insert support members (25).

26 Claims, 4 Drawing Sheets

US 6,702,524 B2

BROACH CARRIER

The present application is a continuation of PCT Patent Application No. PCT/US01/17938, filed Jun. 4, 2001, and is corporated herein by reference.

BACKGROUND OF THE INVENTION

The present invention relates generally to broaching tools. More particularly, one form of the present invention relates to a broach tool having a row of removable cutting inserts spaced apart and supported by removable insert support members. Although the present invention was developed for an application involving manufacturing gas turbine engine components, many applications may be outside this field.

Broaching tools have been used for many years for the machining of metallic materials, and for specific operations such as broaching slots, openings or channels in structures. One conventional broaching tool is a unitary broach having a plurality of cutting teeth integrally formed on a cutting bar. Conventional unitary broaches have some inherent limitations in their designs. One limitation associated with the unitary broach integral cutting teeth is that the worst tooth limits the quality of the overall broaching tool. For example, the existence of an undersized cutting tooth results in an overloading of the next tooth, as well as making it often necessary, because of wear or otherwise, to substantially rework the tool or discard the entire tool even though there is still useful life left in many of the other cutting teeth. Historically, damage to one cutting tooth or any one part of the tool has often resulted in the entire unitary broach tool being discarded. Further, the material from which the unitary broach is manufactured has generally been restricted to high-speed steels because of the relatively high cost associated with materials such as carbides.

A second type of conventional broaching tool includes a plurality of separate cutting inserts that are fixed to the tool body. The cutting inserts are typically formed from a carbide material or other hard metal and permanently attached to the tool body in a brazed construction or removably clamped to the tool body by a mechanical clamping structure. Brazed construction broaching tools have generally been limited by failure of the braze joint in the broaching tool manufacturing process or during the utilization of the broaching tool in a manufacturing process of forming an opening in a workpiece. Traditionally, the repair and requalification of a broaching tool is a lengthy and time intensive process.

Although many of the prior broaching tools having cutting inserts clamped to a tool body have been steps in the right direction, there still remains a need for additional improvement. The present invention satisfies this need in a novel and non-obvious way.

SUMMARY OF THE INVENTION

One form of the present invention contemplates a broach tool, comprising: a plurality of cutting inserts having a root portion and a cutting portion, the root portion has a base surface and a restraining surface; a carrier including a longitudinally elongated slot defined in the carrier by opposed first and second side walls, a base wall and a top wall, each of the root portions disposed within the longitudinal slot with the base surface located adjacent the base wall and the restraining surface located adjacent the top wall and the cutting portions extending from the carrier; and, an insert support member separable from the carrier and positioned between and longitudinally spacing a pair of the plurality of cutting inserts within the slot, the insert support member extending substantially along the pair of cutting inserts and adapted to reinforce at least one of the pair of cutting inserts during a broaching operation.

Another form of the present invention contemplates a broach tool, comprising: a plurality of broaching inserts having a first retaining portion and a cutting portion; a holder including a longitudinally extending slot defined in the holder, each of the first retaining portions is located within the slot and captured by a portion of the holder, the cutting portion extending from the holder through a longitudinally extending opening in the top wall; and, a plurality of insert support members having a second retaining portion located within the slot and captured by the portion of the holder, one of the plurality of insert support members is located between and longitudinally spaces apart adjacent ones of the plurality of broaching inserts, each of the plurality of insert support members abutting the adjacent ones of the plurality of broaching inserts along a bracing portion, and the bracing portion adapted to reinforce the broaching insert during a broaching operation.

One object of the present invention is to provide a unique broaching tool.

Related objects and advantages of the present invention will be apparent form the following description.

DESCRIPTION OF THE PREFERRED EMBODIMENTS

Figure 1:
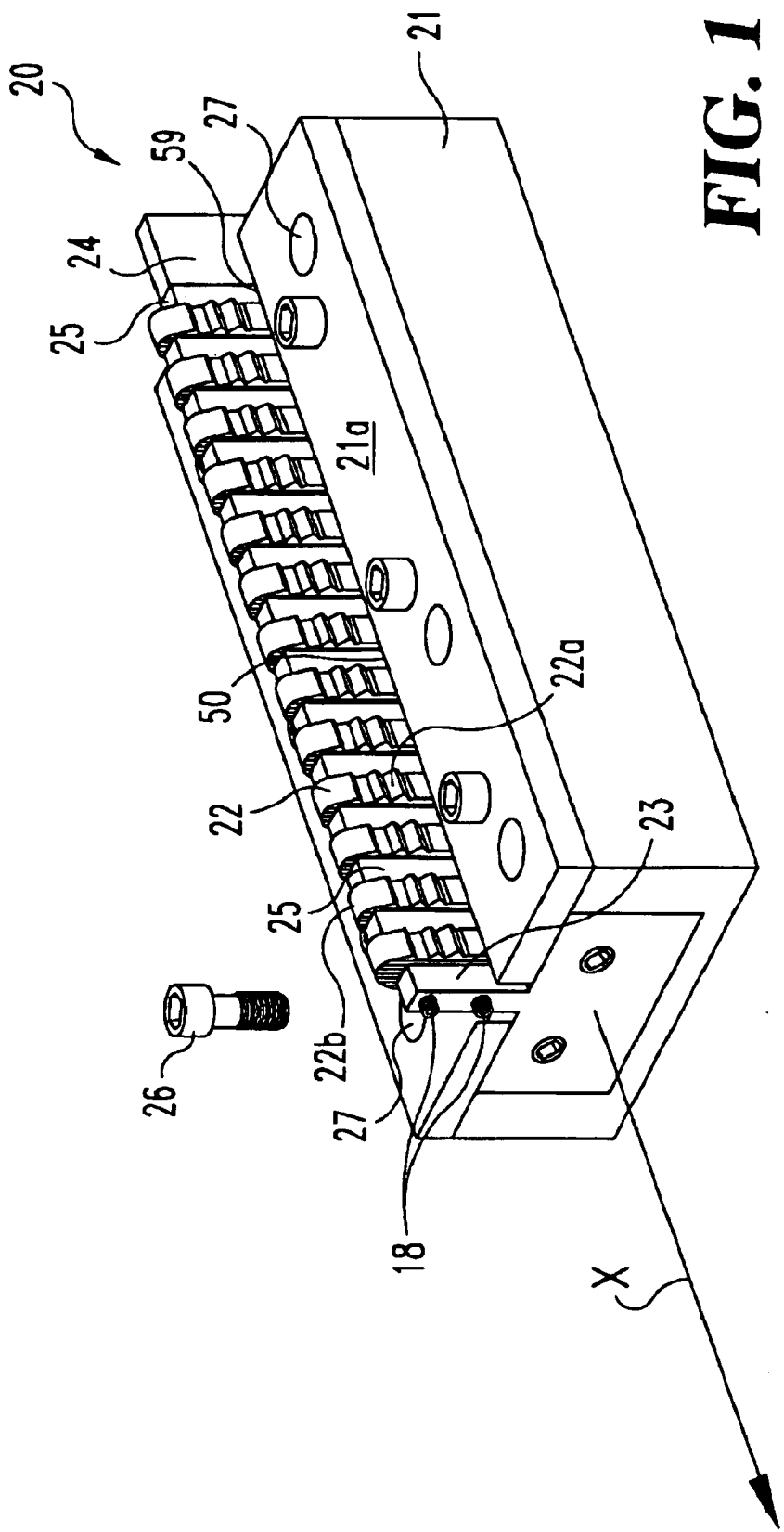
FIG. 1 is a perspective view of one embodiment of the broaching tool of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a perspective view of a broaching assembly 20 including a broach carrier 21 of one embodiment of the present invention. Broach carrier 21 is designed and constructed to receive and securely hold during a broaching operation a plurality of spaced cutting inserts 22 with at least one cutting portion defined thereon and extending from the surface 21a of the broach carrier 21. The cutting inserts 22 are configured for broaching and are formed from a material suitable for the desired broaching operation, such as carbide, tool steel, or another hard metallic material, to name just a few nonlimiting examples. The cutting inserts 22 may have a cutting surface on the tip and/or cutting surfaces on the sides of the tool, and in one embodiment of the present invention the cutting surfaces are defined on the side surfaces 22a.

The plurality of cutting inserts 22 is positioned between a front-loader member 23 and a rear-backing member 24. An insert support member 25, that is separable from the broach carrier 21, is coupled with the broach carrier 21 and positioned between adjacent pairs of the plurality of cutting inserts 22. In a preferred form of the present invention each of the plurality of insert support members 25 longitudinally space the cutting inserts 22 and provide bracing for a cutting insert 22 during the broaching process. In a preferred form of the present invention the insert support member 25 extends along the substantial entire length of the cutting insert 22. In one form of the present invention the insert support members 25 extend to within ten thousandths of an inch from the tip 22b of the cutting insert. However, the insert support member 25 does not interfere with the cutting surface formed on each of the cutting inserts 22. Further, in other forms of the present invention the insert support member 25 extends to different lengths along the cutting insert 22.

The broaching assembly 20 is adapted to be coupled to the support member of a broaching machine by a plurality of fasteners 26. In one embodiment a bolster defines the support member. Each of the plurality of fasteners 26 passes through an opening 27 formed in the broach carrier 21 and is adapted to engage a correspondingly threaded opening in the support member of the broaching machine. The broaching assembly 20 is configured to be readily coupled to a variety of machines that can be utilized for broaching an opening in a workpiece.

Figure 2:
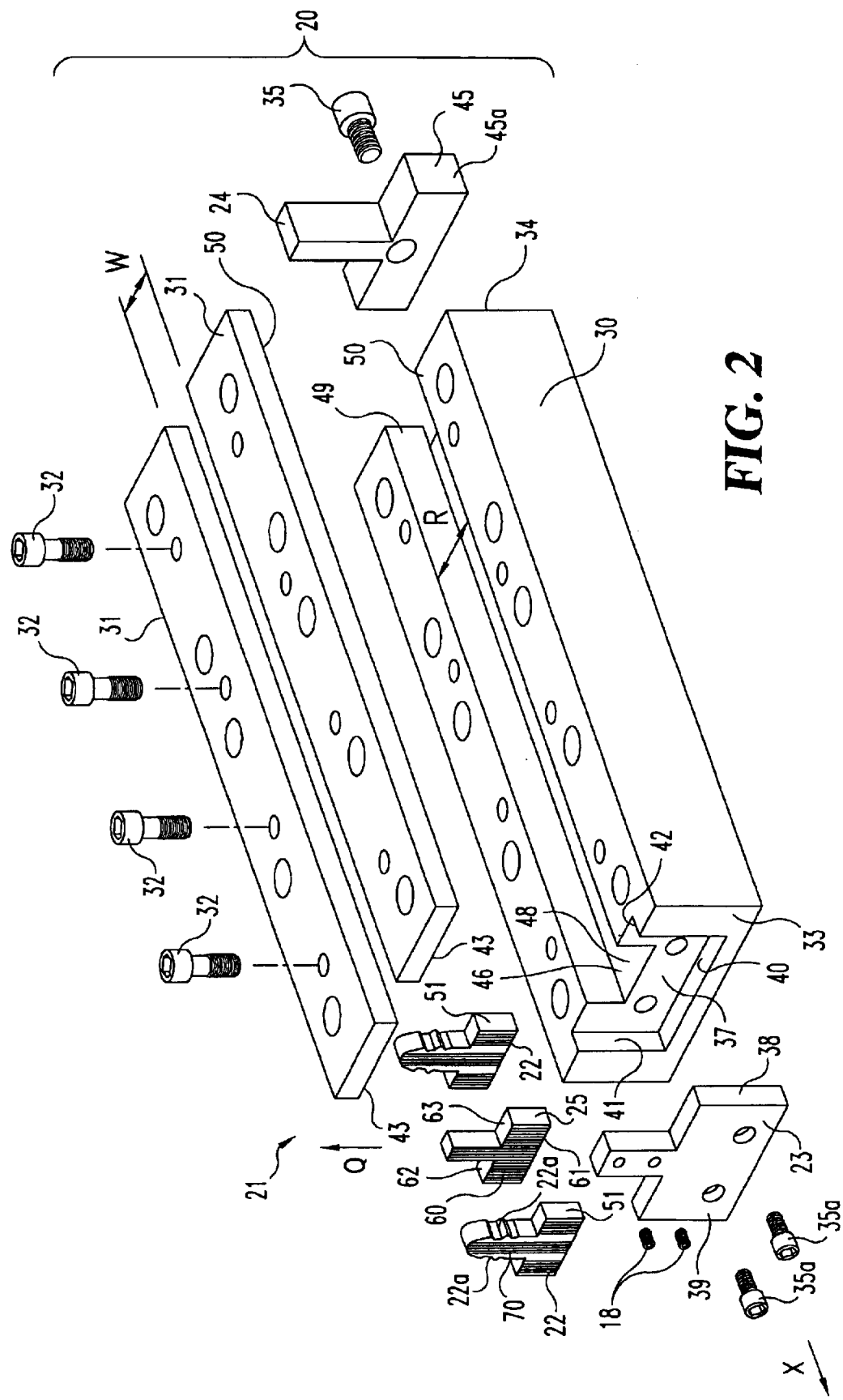
FIG. 2 is an exploded view of the broaching tool of FIG. 1.

With reference to FIG. 2, there is illustrated an exploded view of the broach assembly 20. The exploded view in FIG. 2, shows only a pair of the plurality of cutting inserts 22 and only one of the plurality of insert support members 25, however, it is understood that a plurality of cutting inserts 22 and a plurality of insert support members 25 are coupled with broach carrier 21. The broach carrier 21 of one form of the present invention includes a main body member 30 with a pair of removable cover members 31 attached thereto by a plurality of fasteners 32. In an alternate embodiment of the present invention there is contemplated a broach carrier with an integral main body member and cover members. The broach carrier 21 is preferably of a metallic material. At the front end 33 of the main body member 30 is coupled the front-loader member 23 and at the rear end 34 of the main body member 30 is coupled the rear-backing member 24. In one form of the present invention the plurality of cutting inserts 22 and the plurality of insert support members 25 are preloaded between the front-loader member 23 and the rear-backing member 24. Further, a pair of adjusters 18 are received within the front-loader member 23 and contact one of the plurality of cutting inserts 22 to apply a preload force to the sandwich of cutting inserts 22 and insert support members 25. However, in another form of the present invention the pair of adjustors tighten the sandwich of cutting inserts 22 and insert support members 25 but do not apply any significant preload. Further, in one form of the present invention the pair of adjusters 18 are defined by setscrews.

In a preferred form of the present invention the front-loader member 23 and the rear-backing member 24 are coupled to the main body member 30 by threaded fasteners 35a and 35. In a more preferred form of the present invention the front-loader member 23 is configured to be received within a relief 37 formed in the main body member 30. The relief-engaging perimeter 38 of the front-loader member 23 is received within the relief 37 defined in the front end 33 of the main body-member 30. The front-loader member 23 has a root portion 39 that is captured between a base surface 40 of the main body member 30, opposed side surfaces 41 and 42 of the main body member 30 and an underside surface 43 that described for the front-loader member 23. More specifically, the root portion 45 of the rear-backing member 24 has a perimeter 45a that is captured between a similar group of surfaces that capture root portion 39 of the front-loader member 23. The rear-backing member 24 and the front-loader member 23 are mechanically sturdy structures designed and constructed to withstand the loads transmitted during the broaching of a workpiece. In another form of the present invention one of the front-loader member 23 and the rear-backing member 24 are integrally formed with the main body member 30. Further, in another form of the present invention the front-loader member and/or the rear-backing member are connected to the main body member in a flush abutting type of mounting arrangement. Each of the front-loader member 23, the rear backing member 24 and the pair of removable cover members 31 are preferably formed of a metallic material. In one form of the present invention they are formed of the same material as the main body member 30.

Main body member 30 has a channel 46 formed therein and extending between the front end 33 and the rear end 34. In a preferred form of the present invention the channel 46 defines a slot that is elongated in the direction of the longitudinal axis X of the broach assembly 20. The channel 46 is defined by a channel base wall 48 in the main body member 30, a pair of opposed sidewalls 49 and 50 in the main body member 30 and a portion of the underside of each of the pair of removable cover wall members 31. In one embodiment of the present invention the channel base wall 48, the pair of opposed side walls 49 and 50 and the top wall defined on the underside of the removable cover wall members 31 are elongated in a direction substantially parallel with longitudinal centerline X. In the installed position on main body member 30 the pair of removable cover members 31 define an elongated opening 59 that the cutting inserts 22 and the insert support members 25 extend through. The elongated opening 59 has a width W that is smaller than the width R of the channel 46. Further, in a preferred form of the present invention the plurality of cutting inserts 22 and the plurality of insert support members 25 are substantially aligned in a row parallel with the longitudinal centerline X. The top wall defined by the pair of removable cover members 31 prevents movement of the plurality of insert support members 25 and the plurality of cutting inserts 22 in a direction substantially perpendicular to channel 46.

Figure 3:
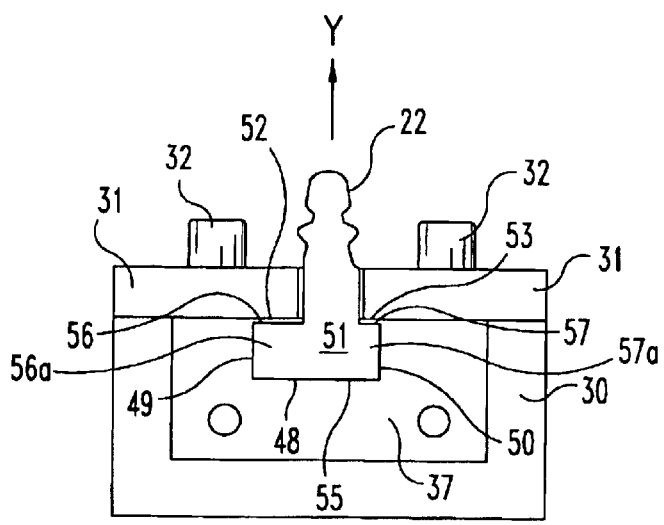
FIG. 3 is an end view of the broaching tool of FIG. 1, with the front loading member removed to show the location of the cutting insert within the longitudinal slot.

With reference to FIG. 3, there is illustrated a front-end view of the broach assembly 20 with the front-loader member 23 removed. Root portion 51 of the cutting insert 22 is positioned within the channel 46. The root portion 51 is disposed in form fitting relationship with the base wall 48 of the main body member 30, the pair of opposed sidewalls 49 and 50 of the main body member 30 and the underside surfaces 52 and 53 of removable cover wall members 31. A base surface 55 is formed on root portion 51 and abuts the base wall 48 of the main body member 30, the restraining surfaces 56 and 57 abut the underside surfaces 52 and 53 of the removable cover wall members 31. In a preferred form of the present invention each cutting insert 22 has a centerline Y. The restraining surfaces 56 and 57 extend from the cutting insert main body on both sides of this centerline. In one form of the present invention the restraining surfaces portion 56a and 57a of the cutting insert 22 are of different size to facilitate locating the cutting insert within the slot in a specific orientation. However, the present invention contemplates other geometric relationships between the restraining surface portions.

Referring back to FIG. 2, there is illustrated that each of the insert support members 25 has a root portion 60 including a base surface 61 and a pair of restraining surfaces 62 and 63. Further, the root portion 60 of each insert support member 25 is preferably disposed within channel 46 in a form fitting relationship with the base wall 48 of the main body member 30, the pair of opposed sidewalls 49 and 50 of the main body member 30 and the underside surfaces 52 and 53 of removable cover wall members 31. Base surface 61 of the root portion 60 abuts the base wall 48 and the pair of restraining surfaces 62 and 63 abut the underside surfaces 52 and 53 of the removable cover wall members 31. Further, the insert support member 25 has a centerline Q, and the restraining surfaces 62 and 63 extend from the insert support member body on both sides of the centerline. In one form of the present invention the restraining surfaces portion of the insert support members 25 are of different size to facilitate locating the insert support members within the slot in a specific orientation. However, the present invention contemplates other geometric relationships between the restraining surface portions.

Figure 4:
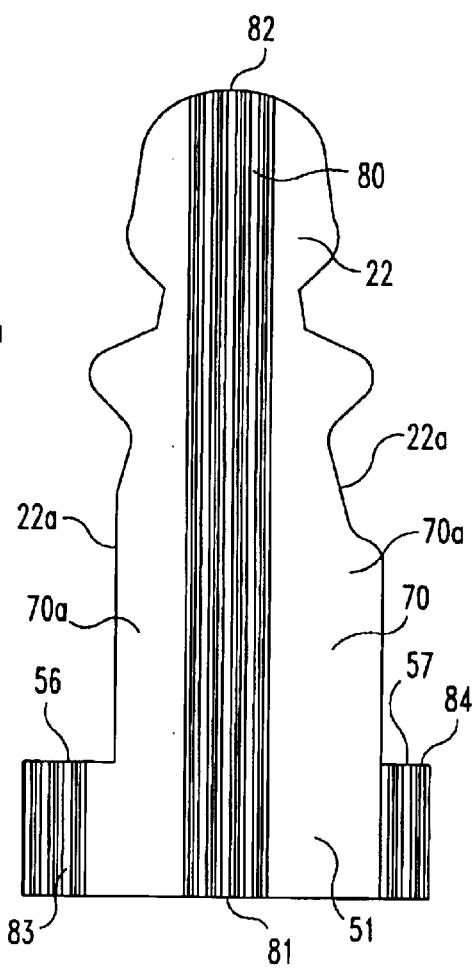
FIG. 4 is a side view of one embodiment of a cutting insert comprising a portion of the FIG. 1 broaching tool.
Figure 5:
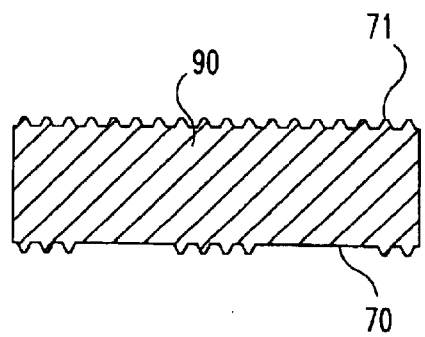
FIG. 5 is an end view of the FIG. 4 cutting insert.

With reference to FIGS. 4 and 5, there is illustrated one embodiment of the cutting inserts 22 of the present invention. The present invention contemplates cutting inserts having other geometric shapes and formed of a variety of materials and is not limited to the specific geometric configurations illustrated unless provided to the contrary. However, any cutting insert utilized in the present invention requires an attachment structure compatible with the channel structure of the broach carrier of the present invention. The cutting insert 22 preferably includes a lateral support surface defined on each of the opposed faces 70 and 71 that is designed to provide lateral support for the cutting inserts 22. The lateral support surfaces on the faces 70 and 71 are configured to engage with a corresponding lateral support surface defined on the adjacent insert support members 25. In one embodiment the lateral support surfaces are preferably defined by a serrated or notched configuration. In a preferred form of the present invention a first face 70 of each of the cutting inserts 22 includes a lateral support portion 80 extending from the first end 81 to the second end 82, and a pair of lateral support surfaces 83 and 84 extending on the root portion 51 between the first end 81 and the restraining surfaces 56 and 57. On the second side 71 a lateral support surface 90 is defined that extends along the entire cutting insert body. In one alternate embodiment both of the faces 70 and 71 have a lateral support surface that covers their entire face. However, other lateral support surface configurations are contemplated herein. In a preferred form of the present invention the first face 70 and the second face 71 have substantially dissimilar lateral surface configurations.

Figure 6:
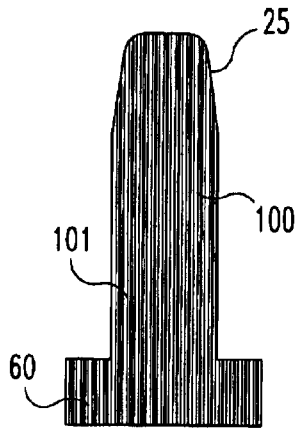
FIG. 6 is a side view of one embodiment of an insert support member comprising a portion of the FIG. 1 broaching tool.
Figure 7:
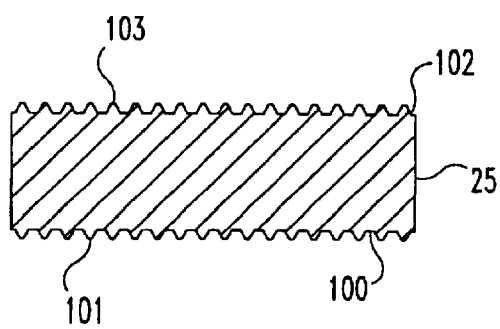
FIG. 7 is an end view of the FIG. 6 insert support member.

With reference to FIGS. 6 and 7, there is illustrated one embodiment of the insert support member 25. Insert support member 25 has a lateral support surface 100 defined on a first surface 101 that is configured to engage with the lateral support surfaces on side 71 of the cutting insert 22. On the other side 102 of the insert support member 25 is defined a second lateral support surface 103 that is configured to engage with the lateral support surfaces on side 70 of the cutting insert 22. The lateral support surfaces 101 and 103 are preferably defined by a serrated or notched configuration. In one form of the present invention the insert support members 25 are formed of a material that is softer than the material that the cutting inserts 22 are formed of. This allows for some deformation of the insert support members 25 during assembly to compensate for misalignment matters. In one form of the present invention the insert support members 25 and the cutting inserts 22 are formed of the same material. In one preferred form of the present invention the root portion 51 of the cutting insert 22 and the root portion 60 of the insert support member 25 have the same composition, configuration, size and shape. Nonetheless, in other embodiments, root portion 51 and root portion 61 may differ as would occur to one skilled in the art.

Figure 8:
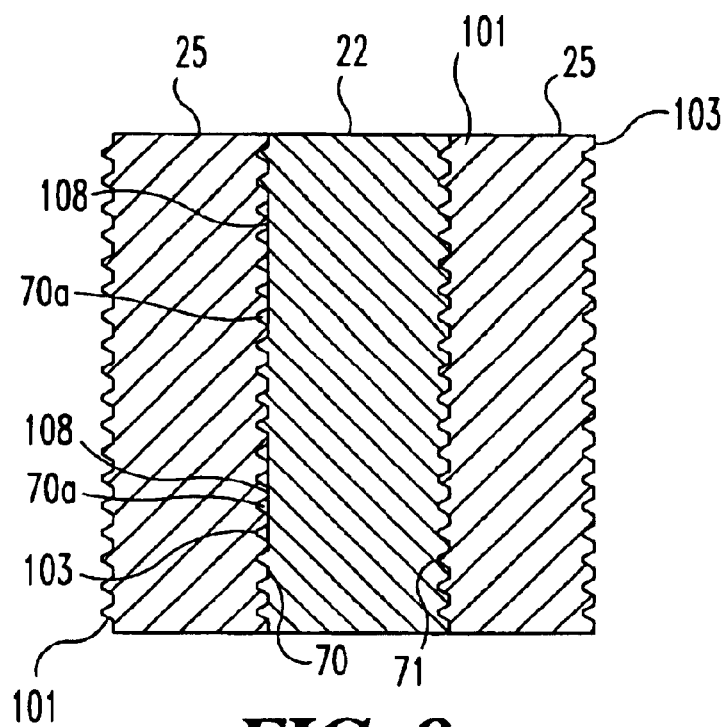
FIG. 8 is a sectional view through the root portions of a cutting insert positioned between a pair of insert support members.

With reference to FIG. 8, there is illustrated a sectional view taken through the root portion of a cutting insert 22 disposed between a pair of insert support members 25. The lateral support surface 103 of the first insert support member 25 is engaged with the lateral support surfaces on face 70 of the cutting insert 22, and the lateral support surface 101 of the second insert support member 25 is engaged with the lateral support surfaces on the face 71 of the cutting insert 22. The insert support member 25 provides lateral support and bracing along the length of the cutting insert 22. Further, a pair of fluid flow channels 108 is defined between the serrated or notched configuration of a portion of surface 103 of the first insert support member 25 and surface 70a of the cutting insert 22. The fluid flow channels allow for the passage of a fluid along the length of the cutting insert 22 and to be discharged during the broaching operation. Preferably the fluid is a lubricant or coolant that is discharged at the second end 82. However, other discharge locations for the fluid are contemplated herein. The present invention contemplates that there may only be one fluid flow channel or a plurality of fluid flow channels. It is also contemplated herein that one embodiment of the present invention does not have a fluid flow channel defined between the insert support member 25 and the cutting insert 22.

Figure 9:
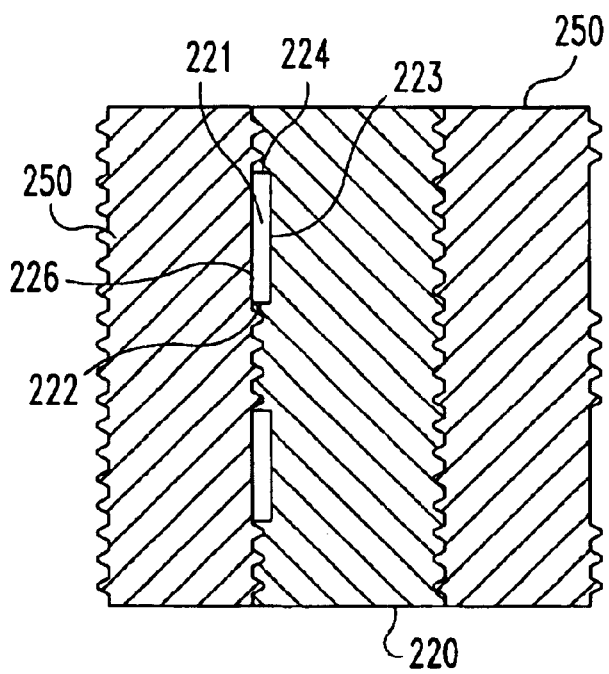
FIG. 9 is a sectional view through the root portions of an alternate embodiment of a cutting insert positioned between a pair of insert support members.

With reference to FIG. 9, there is illustrated a sectional view taken through the root portion of an alternate embodiment of a cutting insert 220 disposed between a pair of insert support members 250. The cutting insert 220 has at least one channel 221 formed therein and extending along its length for the passage of a fluid. The fluid is preferably a lubricant or coolant that is discharged during the broaching process. In a preferred form the channel 221 has three sides 222, 223 and 224 formed in the cutting insert 220. The fourth side is defined by a surface 226 of the insert support member 25. The channel 221 is in fluid communication with a second fluid flow passageway in the broach carrier. In a preferred form of the present invention the cutting insert 220 has a pair of fluid flow channels 221 formed therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one, " "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A broach tool, comprising:
   a plurality of cutting inserts having a root portion and a cutting portion, said root portion having a base surface and a restraining surface;
   a carrier including a longitudinally elongated slot defined in said carrier by opposed first and second side walls, a base wall and a top wall, each of said root portions disposed within said longitudinal slot with said base surface located adjacent said base wall and said restraining surface located adjacent said top wall and said cutting portions extending from said carrier; and
   an insert support member separable from said carrier and positioned between and longitudinally spacing a pair of said plurality of cutting inserts within said slot, said insert support member extending substantially along said pair of cutting inserts and adapted to reinforce at least one of said pair of cutting inserts during a broaching operation.

2. The broach tool of claim 1, which further includes first lateral support means for providing lateral support between one of said pair of said plurality of cutting inserts and a first face of said insert support member, and which further includes second lateral support means for providing lateral support between the other of said pair of cutting inserts and a second face of said insert support member.

3. The broach tool of claim 2, wherein said first and second lateral support means includes at least one of a serrated and a notched interface system.

4. The broach tool of claim 2, wherein said first lateral support means and said second lateral support means are dissimilar.

5. The broach tool of claim 1, wherein each of said plurality of cutting inserts has a first face with a first serrated portion and a second face with a second serrated portion, and wherein said insert support member has a third face with a third serrated portion and a fourth face with a fourth serrated portion, and further wherein said third serrated portion interengages with said second serrated portion of one of said pair of said plurality of cutting inserts and said fourth serrated portion interengages with said first serrated portion of the other of said pair of said plurality of cutting inserts.

6. The broach tool of claim 1, wherein said insert support member and said plurality of cutting inserts are made of different materials.

7. The broach tool of claim 6, wherein said insert support member is formed of a material that is softer than the material that the plurality of cutting inserts is formed of.

8. The broach tool of claim 1, wherein said elongated slot has a first portion sized to receive said root portion and a second smaller portion sized to allow the extension of said cutting portion from said carrier, and wherein said top wall prevents movement of said insert support member and said plurality of cutting inserts in a direction substantially perpendicular to said longitudinally elongated slot.

9. The broach tool of claim 8, which further includes a backing member located at one end of said longitudinal slot and a loading member located at the other end of said longitudinal slot, and wherein said plurality of cutting inserts and said insert support member are loaded in compression between said backing member and said loading member.

10. The broach tool of claim 8, wherein said top wall is defined on a cover member that is removeably coupled to said carrier.

11. The broach tool of claim 1, wherein each of said plurality of cutting inserts has a centerline, and wherein said restraining surface extends from said cutting insert on both sides of said centerline.

12. The broach tool of claim 11, wherein said insert support member includes an attachment portion disposed within said longitudinal slot, and wherein said top wall substantially limits movement of said insert support member and said plurality of cutting inserts.

13. The broach tool of claim 12, wherein said attachment portion and said root portion are substantially similar, and wherein said attachment portion and said root portion are substantially captured within said slot.

14. The broach tool of claim 1, which further includes a lubricant delivery passage defined between said insert support member and at least one of said pair of said plurality of cutting inserts.

15. The broach of claim 1, which further includes first lateral support means for providing lateral support between one of said pair of said plurality of cutting inserts and a first face of said insert support member, and which further includes second lateral support means for providing lateral support between the other of said pair of cutting inserts and a second face of said insert support member;
   wherein said insert support member and said plurality of cutting inserts are made of different materials, and wherein said insert support member is formed of a softer material than said plurality of cutting inserts;
   wherein said elongated slot has a first portion sized to receive said root portion and a second smaller portion substantially sized to said cutting portion extending from said carrier, and wherein said top wall prevents movement of said insert support member and said plurality of cutting inserts in a direction substantially perpendicular to said longitudinally elongated slot;
   wherein said insert support member has a centerline and an attachment surface extending from said insert support member on both sides of said centerline, and wherein said attachment surface is disposed in an abutting relationship with said top wall; and
   wherein each of said plurality of cutting inserts has a centerline, and wherein said restraining surface extending from said cutting insert on both sides of said centerline.

16. The broach tool of claim 1, wherein each of said plurality of cutting inserts has a length and a tip end, and wherein said insert support member extends along said length to within about 0.01 inches of said tip end.

17. The broach tool of claim 1, wherein each of said plurality of cutting inserts including a pair of opposed sides and a tip, and wherein at least one of said pair of opposed sides including a cutting surface.

18. A broach tool, comprising:
   a plurality of broaching inserts having a first retaining portion and a cutting portion;
   a holder including a longitudinally extending slot defined in said holder, each of said first retaining portions located within said slot and captured by a holding portion of said holder, said cutting portion extending from said holder through a longitudinally extending opening in said top wall; and a plurality of insert support members having a second retaining portion located within said slot and captured by said holding portion of said holder, one of said plurality of insert support members located between and longitudinally spaces apart adjacent ones of said plurality of broaching inserts, each of said plurality of insert support members abutting the adjacent ones of said plurality of broaching inserts along a bracing portion of said insert support member, and said bracing portion adapted to reinforce said broaching insert during a broaching operation.

19. The broach tool of claim 18, wherein said holding portion of said holder is defined by a plurality of wall members defining said slot, and wherein at least one of said plurality of wall members prevents movement of said plurality of broaching inserts and said plurality of insert support members in a direction substantially transverse to said slot.

20. The broach tool of claim 19, wherein said longitudinally extending slot includes a first end and a second end, and which further includes a front loading member disposed adjacent the first end of said slot and a back restraining member disposed adjacent a second end of said slot, and wherein said longitudinally extending slot is filled with said plurality of broaching inserts and said plurality of insert support members, and further wherein said front loading member and said back restraining member prevent movement of said plurality of broaching inserts and said plurality of insert support members parallel with said longitudinally extending slot.

21. The broach tool of claim 20, wherein each of said plurality of cutting inserts has a first face with a first serrated portion and a second face with a second serrated portion, and wherein each of said plurality of insert support members has a third face with a third serrated portion and a fourth face with a fourth serrated portion, and further wherein each of said third serrated portions interengage with a respective one of said second serrated portions of said plurality of cutting inserts and each of said fourth serrated portions interengage with a respective one of said first serrated portions of another of said plurality of cutting inserts.

22. The broach tool of claim 21, wherein said plurality of insert support members are formed of a material softer than said plurality of cutting inserts, and wherein said plurality of insert support members are deformable to facilitate alignment during assembly of said plurality of cutting inserts.

23. The broach tool of claim 21, which further includes at least one lubrication delivery passageway defined between one of said plurality of insert support members and an abutting one of said plurality of broaching inserts.

24. The broach tool of claim 21, wherein said plurality of cutting inserts are formed of a carbide material.

25. The broach tool of claim 18:

wherein said holding portion of said holder includes a pair of removable cover walls, and wherein said longitudinally extending opening is defined between said pair of removable cover walls;

wherein said holder includes opposed first and second walls and a base wall formed therein, and said first and second walls and said base wall and said pair of removable cover walls define said holding portion of said holder;

wherein said longitudinally extending slot includes a first end and a second end, and which further includes a front loading member disposed adjacent the first end of said slot and a back restraining member disposed adjacent a second end of said slot, and wherein said longitudinally extending slot is filled with said plurality of broaching inserts and said plurality of insert support members, and further wherein said front loading member and said back restraining member prevent movement of said plurality of broaching inserts and said plurality of insert support members in a direction substantially parallel with said longitudinally extending slot; and which further includes serrated support means engaging between said insert support members and said adjacent ones of said plurality of broaching inserts for lateral support.

26. The broach tool of claim 25, wherein said broaching inserts are formed of carbide, and which further includes a lubrication channel defined between one of said plurality of insert support members and one of said broaching inserts.

* * * * *